Jan. 16, 1934.  F. B. HOBART  1,944,007

LIGHT WEIGHT CERAMIC MATERIAL AND METHOD OF MAKING THE SAME

Filed April 1, 1933

INVENTOR.
Floyd B. Hobart.

BY
ATTORNEYS.

Patented Jan. 16, 1934

1,944,007

UNITED STATES PATENT OFFICE 1,944,007

LIGHT WEIGHT CERAMIC MATERIAL AND METHOD OF MAKING THE SAME

Floyd B. Hobart, Columbus, Ohio, assignor to The Battelle Memorial Institute, Columbus, Ohio, a corporation of Ohio Application April 1, 1933. Serial No. 663,975

34 Claims. (Cl. 25—156)

My invention relates to light weight ceramic material and method of making the same. It has to do with the making of light weight bricks or blocks which are particularly applicable to heat or sound insulation, though it is not necessarily limited thereto.

In the prior art, various efforts have been made to produce light weight ceramic material of the type indicated. Some of these efforts have involved the mixing of a clay and organic material such as sawdust or ground cork with water to produce a plastic mass which is molded, dried and then fired during which process the organic material is burnt out. One difficulty arising in this process is that heat is generated by the burning out of the organic material and this tends to prevent uniform firing of the products.

Other efforts have involved the production of cellular gypsum, cellular concrete and cellular clay wherein calcined gypsum is utilized for setting the product. Some of these effort have involved the use of reacting chemicals within the composition during the setting of the product in order to produce voids therein to decrease density. Where calcined gypsum or concrete is used, the setting thereof imposes a time limitation upon the reaction of the chemical. Furthermore, the mixture is ordinarily so fluid that it must be cast in molds and permitted to set before the product is taken from the mold.

Where chemicals are used with a clay product for the purpose of forming a gas to produce voids in such product, the mixture must be of such fluidity that it has no plasticity or workability. Furthermore, it will not set of its own accord. Therefore, calcined gypsum is ordinarily utilized for setting the product. Thus, the mixture must be poured into a mold and permitted to remain in such mold until setting of the gypsum is effected. The result is that there is no stage of plasticity or workability and it is not possible to extrude the material to form the product. Neither is it possible to remove the mold until the gypsum has definitely set. Likewise, the reaction of the gas forming chemicals is difficult to control, both because of the time limitation imposed by the setting of the calcined gypsum and because of the time variations which inevitably arise in all chemical reactions under different temperature conditions.

Still other efforts have involved the production of a foam and the addition thereto of a mixture of water with clay or similar materials. A product made in this manner, however, contains a large amount of water and is quite fragile and subject to excessive shrinkage on drying and possesses other undesirable characteristics. Some effort has been made to overcome these drawbacks by adding calcined gypsum to the mixture. The mixture is necessarily of a fluid type which must be cast and allowed to remain in the mold until the gypsum sets. It possesses no stage of plasticity and workability.

One of the objects of this invention is to provide a light weight ceramic material and a method of making the same which will be simple and readily controllable so that a product can be produced of any definite size and with a minimum of difficulty.

Another object of this invention is to provide a light weight ceramic material and a method of making the same which may be fired in the ordinary manner and with the usual firing temperatures without complication from the necessity of burning out organic material.

Another object of this invention is to provide such a material and method of making the same wherein the density of the material may be controlled with greater certainty during the formation thereof.

Various other objects of this invention will appear as this description progresses.

In its preferred form, my invention contemplates the mixing of a finely divided clay and grog or the like in a dilute sodium silicate solution in such a ratio as to give a highly fluid mixture. A small amount of foaming or frothing agent, such as saponin, is added to this mixture. The mixture is then subjected to a vigorous agitation or beating, sufficient to cause the mixture to be changed into a foam of a creamy composition. This agitation or beating causes the admixture of air with the mass so as to greatly decrease its density. The violence and duration of the beating action will determine the ultimate density of the product, with due consideration to the results of the additional steps to be described.

It will be understood that the addition of the sodium silicate solution to the clay and grog mixture will bring about a dispersion of the particles of clay, as a result of the alkalinity of the sodium silicate. Thus, the finely divided particles of clay may be adequately dispersed while the amount of water or other liquid used is comparatively limited.

After this solution has been foamed or frothed to the extent desired for the attainment of the selected density or volume of the solution, I introduce an acid material, preferably carbon dioxide gas. The immediate results of the introduction of the carbon dioxide gas, in proper quantity, into the foamed solution is the flocculation of the clay particles followed by the gelation of the mass through the reaction of the acid with the soluble silicates contained therein.

The flocculation causes the mixture to stiffen and become plastic to such an extent that it is suitable for molding, casting or extruding through dies to produce the desired size and shape of product. The reaction of the materials can be controlled by controlling the introduction of the acid material and of its acid strength to give a definite and regulable period of plasticity after flocculation and before gelation progresses to a degree of rigidity that will preclude molding or shaping of the mixture. This period of plasticity permits of molding or extruding the mixture, instead of casting or pouring such as would be necessary with the usual fluid mixture. The gelation which progressively follows permits of the formation of a product which will not slump or sag from its own weight and which may be removed from a mold before drying, as contradistinguished from the usual fluid slip.

A product made in accordance with my invention is shown in the accompanying drawing wherein.

In the clay-grog mixes, various ratios of clay and grog have been used by me in the making of bricks or blocks. With different size grog particles and with various clays, the ratios would necessarily vary considerably. I have used grog made by grinding fire-brick to twenty mesh size and have used Kentucky ball clay therewith. A ratio of 70 parts grog to 30 parts clay seems to be about right for these materials.

Figure 2:
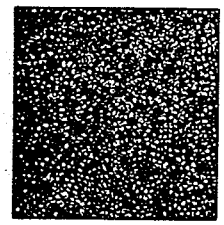
Figure 2 is an enlarged plan view of a portion of a brick or block made of clay and grog in accordance with my invention.

In the mix resulting in the product which I carried through the firing stage, and which is partially illustrated in Figure 2, I used:

7 parts 20-mesh grog
 3 parts Kentucky ball clay
 5 parts sodium silicate solution of about 8° Bé. containing 1:3.22 ratio silicate
 .02 parts saponin as a foaming agent.

This mixture was foamed to a creamy consistency and carbon dioxide gas, as the acid material, was introduced into the mixture by bubbling it under the surface for from two to three minutes. The rate of introduction was comparatively rapid and the introduction for this period of time was sufficient to cause a decided stiffening of the mix and gelation of the silicate.

A part of the mix was cast into a bar 9"x2½"x1½" and dried. On drying the linear shrinkage was 8% and the product had a density equivalent to 35 lbs./cu. ft. This dried bar was fired in a gas-fired furnace to 2500° F. and allowed to cool with the furnace. This caused a second shrinkage of 5% and gave a finished product with a density of 40 lbs./cu. ft.

The product produced was sufficiently strong and light to be considered a highly desirable structural material. Its structural characteristics indicate high insulating properties for a material of this type, both for heat insulation and sound insulation.

I do not wish to limit myself to the foaming and casting of clay ware, but desire to include other ceramic and refractory materials which are now used in the ceramic art. Examples of these are kaolin, silica, chromite, mullite, carborundum, alumina, et cetera, which may be used separately or in combination, or in conjunction with clay. Certain industrial waste materials are also suitable for use in place of clay and/or grog as for instance fly ash which is the ash from the burning of powdered coal which is carried out of the combustion chamber of the furnace by the flue gases and which may be collected therefrom. Ordinarily, about 60% of the total ash is liberated as fly ash on burning the coal in pulverized form. I have substituted fly ash for the clay and grog to advantage in the performance of my method. In some respects, this fly ash partakes of the nature of clay and, its particle size being quite small, grinding is unnecessary. At the present time, there is little or no market for it and there is an ample supply to be had.

Figure 1:
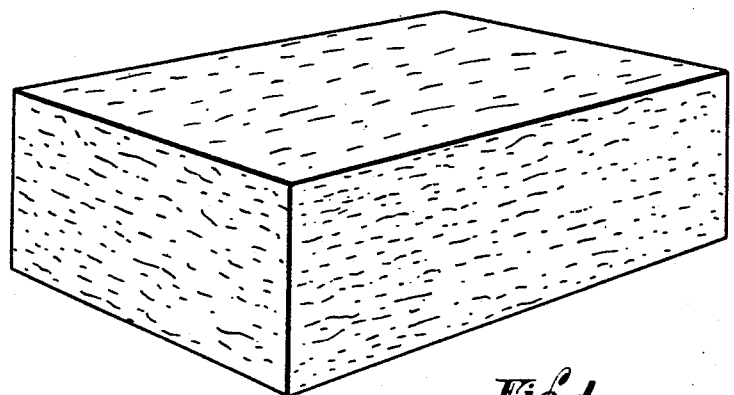
Figure 1 is a perspective view of a brick or block made in accordance with my invention.
Figure 3:
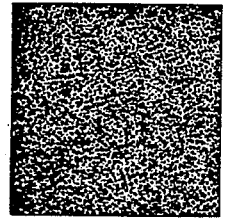
Figure 3 is an enlarged plan view of a portion of a brick or block made of fly ash in accordance with my invention.

The following method was employed in making and firing bricks, such as partially illustrated in Figure 3, wherein fly ash was substituted for the clay and grog:

.175 parts of boric acid was dissolved in
 10.25 parts of water, to which was added
 .05 parts of saponin, and
 3.5 parts of 33.5° Bé. sodium silicate solution of 1:3.86 ratio.

This mixture was agitated to produce a foam and 20 parts of fly ash dampened with three parts of water was stirred in. Stirring was continued for about four or five minutes to produce a smooth mixture, whereupon it was cast into brick-sized shapes. These were dried carefully. The dried product was a light weight block having a density equivalent to about 45 lbs./cu. ft. They were fired to 1800° F. in 9 hours and held there for 5 hours. The finished bricks were of uniform cellular structure with a density equivalent to 46 lbs./cu. ft. and a crushing strength equivalent to 750 lbs. per square inch.

In the units produced with clay and grog wherein carbon dioxide gas was used to effect gelation, as described above, the clay became flocculated upon the addition of the carbon dioxide and this flocculation of the clay particles resulted in a multiplicity of comparatively small voids which were generally intercommunicating and of irregular form. Thus, there was produced a structure particularly suitable for sound insulation purposes, though also suitable for heat insulation and for other structural purposes.

In the units produced with fly ash wherein boric acid was used to effect gelation, as described above, flocculation did not occur and the dispersion of the fly ash particles resulted in a multiplicity of comparatively small voids which were generally non-communicating and of vesicular cell formation. Thus, there was produced here a structure particularly suitable for heat insulation, though also suitable for sound insulation and for other structural purposes.

My investigations indicate that, with various raw materials, it may be necessary to employ acids of different degrees of acidity or to control the degree of acidity by the use of chemical agents generally known as buffers in order to control the rate of flocculation and gelation or in order to avoid flocculation if this is desired. The degree of acidity of the material, usually measured in terms of pH, will ordinarily determine the choice of acids or the choice of an acid and a buffer material to bring about the desired action.

It is possible to bring about gelation of the silicate with an acid or with an acid and buffer whose pH is above the range of flocculation for the clay or like material. In this case, there will be no definite stage of stiffening and resultant plasticity of the mixture due to flocculation and the material should be poured or cast in the mold and allowed to remain there while gelation occurs. On the other hand, it is possible to bring about gelation with an acid or with an acid and a buffer whose pH is within the range of flocculation for the clay or like material so as to produce stiffening and a resultant definite stage of plasticity of the mixture, so that the product may be formed by molding or extrusion. Depending upon the conditions selected, products of decidedly different structures may be obtained.

The practical application of this is that, by proper selection of the clay or other fillers and the acid, flocculation may be obtained or not as desired. If no flocculation is obtained, the solidified foamed mass contains a multiplicity of comparatively regular vesicular cells which appear to be of a non-communicating type. If flocculation is produced, the clay or like material gathers into flocs or nodules and tends to concentrate in between the bubbles of the foam. After gelation and subsequent processing, a porous mixture is obtained which has irregularly shaped voids that appear to be largely communicating.

The size of the cells and degree of irregularity in a mixture containing clay and grog is apparently dependent, to some extent, upon the grog particle size. Thus, the selection of the filler and the control of the pH of the acidic material makes possible a wide choice in the size and character of the voids to be produced in the ultimate product.

As an example of the above, my investigations indicate that a mixture of Kentucky No. 4 ball clay and grog made from ground fire-brick may be foamed in a dilute silicate solution to give a dispersed mixture. This may be gelled by the addition of carbon dioxide gas or by the addition of boric acid. Where the carbon dioxide gas is used, the pH of the acid is within the range of flocculation of the clay, whereas, where the boric acid is used, the weaker nature of the boric acid combined with the buffer effect of the sodium borate salt formed by the reaction of the acid with the silicate will result in a pH of the mixture which is above the range of flocculation so that gelation of the mixture occurs while it is in its dispersed state.

It will be seen from this that my process enables me to produce an insulating material embodying a multiplicity of cells which are not only controllable as to size and shape to some extent, but which are either intercommunicating or noncommunicating depending upon the materials selected. Thus, the intercommunicating cell structure, generally considered particularly desirable for sound insulation, may be produced or the non-communicating cell structure, generally thought more desirable for heat insulation, may be obtained in the finished product. The mixture may be cast in a mold or in its place of ultimate use or it may be extruded or otherwise molded.

It will be understood that the foaming of my solution may be brought about by other ways than beating. For example, it may be produced by the introduction of air under pressure into the interior of the mixture. The size of the voids ultimately produced in the product may be regulated to some extent by the time of beating or agitation.

It will likewise be understood that other foaming agents than saponin may be used to facilitate the foaming action. For example, we may use soap bark, sodium oleate, or other soaps, or licorice compounds and, in fact, any one of a number of agents which will serve to alter the surface tension of the silicate solution and facilitate foam production.

Other soluble silicates may be substituted for sodium silicate. For example, potassium silicate may be used or, in fact, any water soluble alkali metal silicate, though it will be understood that the question of cost and availability is a factor to be considered.

It will also be understood that the flocculation of the clay and the gelation of the mass may be obtained by chemical agents other than carbon dioxide gas. For example, these results may be obtained by the use of finely divided acidic metal salts or the solution thereof, as aluminum sulfate, weak acids, as boric acid, organic acids, or very dilute solutions of stronger acids, or acid gases, as sulfur dioxide. As already stated, proper choice of and control of the addition of the acidic material permits the gelation or setting of the mass to take place uniformly throughout the mass and over an appreciable period of time, so that the mass may be brought to any desired consistency and either cast, extruded or otherwise formed into any desired shape and size suitable for subsequent drying or for subsequent drying and firing.

The introduction of the carbon dioxide gas or other acids into the mixture is preferably accompanied by mechanical agitation of the mass to insure complete mixing thereof. However, the mixing may be obtained by the introduction of the gas alone under pressure.

Another advantage of this process arises from the fact that the foaming operation is entirely independent of the setting operation, so that the setting operation imposes no limitation upon and is not in conflict with the foaming operation. This insures that any selected volume and density may be obtained and that the setting operation may be prolonged or shortened at will.

I may also, by introducing a mixture of air and carbon dioxide gas in proper proportion, initiate the foaming of the mixture simultaneously with the initiation of flocculation of the clay and terminate the foaming a substantial period of time prior to gelation to a point of setting of the mass. Thus, by the admission of a properly proportioned mixture of air and carbon dioxide under proper pressure, I may increase the volume of the mass to give the desired density before setting occurs.

I am also able to set the mixture to varying degrees of stiffness desired. This may be effected by controlling the strength and amount of the acid introduced.

I have found that this method permits of the production of units of material of selected sizes which, shortly after being molded to form, will have sufficient rigidity that they may be promptly removed from the mold without danger of slumping. The product thus formed may be dried and then fired or may be merely dried, depending upon the use to which it is to be put.

The process is such that uniform firing may be obtained.

Another advantage of my invention arises from the fact that the volume of the product formed may be predetermined with certainty and that the density thereof may be controlled without difficulty, this density being somewhat dependent upon the amount of liquid in the solution.

Another advantage of this invention arises from the fact that the reaction between the acid and the silicate may be so controlled as to bring about a setting of the product by the use of an intermediate stage during which the mixture is of a plastic nature so that it may be either cast or extruded and so that, if cast, it may be removed from the mold in a more or less plastic state but in such a state that it will not slump.

A further advantage of my method arises from the fact that I utilize a soluble silicate solution which results in the dispersion of the clay particles which may be subsequently flocculated by the introduction of the acidic or other material. The dispersed condition of the clay particles in the soluble silicate solution insures that the solution will be thin enough to permit foaming, while much less water is necessary for the attainment of this thin solution than would be possible where the clay particles are flocculated in an initial solution to be foamed. One result is that the molded or formed product contains much less water which must be removed by drying and this results in much less cracking and shrinking during drying.

Another advantage of this invention is that the unit formed by extrusion or casting and set by gelation will have and retain sufficient rigidity that it may be placed in an oven and dried without danger of slumping. At the same time, it may be shaved or cut to any dimensions, either before or after firing; or a comparatively large unit may be formed and then cut into a number of smaller units.

A still further advantage of this invention arises from the fact that I am able to produce a product having smaller and more numerous voids with a consequent improvement in insulating properties. This is particularly desirable in high temperature insulation, though it is a desirable feature in all types of heat and sound insulation.

By the term "clay" as used in this description, I mean to include the natural mineral substances which are plastic when mixed with water in a finely divided state. These mineral substances may contain, to a more or less degree, those minerals known as clay substances, such as kaolinite, halloysite, montmorillonite, bentonite, diatomaceous earth, wilkinite, and so forth, along with other minerals in more or less amounts, as silica, feldspar, mica, limonite, calcite, gypsum, et cetera.

By the term "grog", as used in this description, I mean to include such materials as ground firebrick or other clay ware and, in addition, the natural occurring non-plastic mineral materials such as the impurities usually found associated with clays.

The phrase "clay or the like", as used in the claims, is intended to cover materials such as defined in the two preceding paragraphs.

Various other features of advantage will appear from the preceding description and from the appended claims.

Having thus described my invention, what I claim is:

1. The method of making light weight porous ceramic material which comprises mixing clay or the like with a soluble silicate solution, foaming such mixture and introducing a chemical to bring about gelation thereof.

2. The method of making light weight porous ceramic material which comprises providing a soluble silicate solution and a solution that will react therewith to effect gelation, introducing clay or the like into one of such solutions, foaming one of such solutions and mixing to effect gelation.

3. The method of making light weight porous ceramic material which comprises mixing clay or the like with a soluble silicate solution, foaming such mixture and introducing an acid which is selected to flocculate or not as desired.

4. The method of making light weight porous ceramic material which comprises mixing clay or the like with a soluble silicate solution, foaming such mixture and introducing a selected quantity of acid of a selected strength to effect flocculation of the clay.

5. The method of making light weight ceramic material which comprises mixing clay or the like with a soluble silicate solution, foaming such mixture and introducing an acid of controlled strength to effect gelation with the clay in the flocculated or dispersed condition as desired.

6. The method of making light weight ceramic material which comprises mixing clay or the like with a soluble silicate solution, foaming such mixture and controlling the pH of the mixture to control the characteristics of the voids appearing in the finished product.

7. The method of making light weight porous ceramic material which comprises mixing a soluble silicate solution with clay or other like material of such a nature that it will flocculate upon acidulation, foaming such mixture, and introducing a chemical which will flocculate and effect gelation of the foamed mixture.

8. The method of making light weight porous ceramic material which comprises mixing a soluble silicate solution with clay or the like of such a nature that it will flocculate upon acidulation, and introducing a chemical that will first cause acidulation and flocculation and then cause gelation of the foamed mixture.

9. The method of making light weight porous ceramic material which comprises mixing a soluble silicate solution with clay and grog, foaming such solution and then introducing a chemical that will effect flocculation and gelation of the mixture.

10. The method of making light weight porous ceramic material which comprises mixing a soluble silicate solution with clay or other like material, foaming such mixture, and then introducing a chemical that will bring about gelation.

11. The method of making light weight porous ceramic material which comprises mixing a soluble silicate solution with clay or the like, agitating such mixture to effect foaming thereof and then introducing a chemical that will bring about gelation.

12. The method of making light weight porous ceramic material which comprises mixing a soluble silicate solution with clay or the like, beating such mixture to effect foaming thereof and then introducing a chemical that will bring about gelation.

13. The method of making light weight porous ceramic material which comprises mixing a foaming agent with a soluble silicate solution and with clay or other like material contained therein, foaming such solution and then introducing a chemical that will effect gelation of the mixture.

14. The method of making light weight porous ceramic material which comprises mixing a soluble silicate solution with clay or other like material and introducing thereinto an acid which will effect gelation of the mixture at such a rate that foaming of the mixture may be effected prior to gelation of the mixture.

15. The method of making light weight porous ceramic material which comprises mixing a soluble silicate solution with fly ash, foaming such mixture and introducing a chemical that will effect gelation of the mixture.

16. The method of making light weight porous ceramic material which comprises mixing clay or the like with a soluble silicate solution, foaming such mixture and effecting gelation of such mixture.

17. The method of making light weight porous ceramic material which comprises mixing clay or the like with a soluble silicate solution, foaming such mixture, effecting gelation of such mixture and then drying and firing.

18. The method of making a light weight porous ceramic product which comprises mixing clay or the like with water, dispersing the clay by means of an alkali and then flocculating it and gelling it by introducing an acid chemical into the mixture.

19. The method of making ceramic material which comprises mixing clay or the like with a soluble silicate solution, foaming such mixture, introducing an acid into such mixture to effect gelation thereof, forming a portion of such mixture, drying and firing.

20. The method of making ceramic material which comprises mixing clay or the like with a soluble silicate solution, foaming such mixture, introducing an acid into such mixture to effect gelation thereof, forming a portion of such mixture by extrusion, drying and firing.

21. The method of making ceramic material which comprises mixing clay or the like with a soluble silicate solution, foaming such mixture, introducing an acid into such mixture to effect gelation thereof, forming such mixture in its place of use and then drying it.

22. The method of producing a ceramic product which comprises foaming a soluble silicate solution, mixing clay or the like and introducing a chemical to effect gelation.

23. The method of making light weight ceramic material which comprises mixing argillaceous material with a soluble silicate solution, foaming said mixture to produce voids in the finished product, introducing a chemical to effect gelation of such foamed mixture and selecting the ingredients of the mixture to regulate the strength of alkalinity or acidity of the mixture to control the characteristics of the voids ultimately produced.

24. The method of making light weight ceramic material which comprises mixing argillaceous material with a soluble silicate solution, foaming such mixture, and flocculating or dispersing the clay particles to regulate the characteristics of the voids in the final product and then gelling the mixture.

25. A porous ceramic product comprising a foamed mixture of clay and soluble silicate solution which has been set by gelation.

26. An undried substance for use in making a light weight porous ceramic product comprising a foamed mixture of clay or the like and soluble silicate solution which has been gelled.

27. A cellular ceramic product comprising a foamed mixture of clay and the like and soluble silicate solution which has been gelled, dried and fired.

28. An undried substance for use in making a light weight porous ceramic product comprising a mixture of clay or the like, and soluble silicate solution and other chemicals with the clay flocculated.

29. An undried substance for use in making a light weight porous ceramic product comprising a mixture of clay or the like, soluble silicate solution and other chemicals with the clay flocculated and the mixture in a gelled state.

30. A cellular ceramic product comprising a foamed mixture of fly ash and soluble silicate solution which has been set by gelation.

31. A cellular ceramic product comprising a gelled mixture of flocculated clay or the like and soluble silicate solution.

32. A cellular ceramic product comprising a gelled mixture of dispersed clay or the like and soluble silicate solution.

33. A cellular ceramic product comprising a gelled mixture of particles which have been dispersed and then flocculated.

34. A cellular ceramic product comprising a foamed mixture of fly ash and soluble silicate solution which has been gelled with the fly ash particles dispersed.

FLOYD B. HOBART.